(12) United States Patent
Mizuguchi

(10) Patent No.: US 8,964,241 B2
(45) Date of Patent: Feb. 24, 2015

(54) PRINT CONTROL DEVICE AND NON-TRANSITORY COMPUTER READABLE MEDIUM FOR STORING MARK INFORMATION IN ACCORDANCE WITH A TYPE OF PRINTER

(71) Applicant: Fuji Xerox Co., Ltd., Minato-ku, Tokyo (JP)

(72) Inventor: Takuya Mizuguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 17 days.

(21) Appl. No.: 13/972,482

(22) Filed: Aug. 21, 2013

(65) Prior Publication Data
US 2014/0253936 A1    Sep. 11, 2014

(30) Foreign Application Priority Data
Mar. 6, 2013   (JP) ................ 2013-044577

(51) Int. Cl.
*G06K 15/22*    (2006.01)
*G06F 3/12*     (2006.01)

(52) U.S. Cl.
CPC ............ *G06F 3/1298* (2013.01); *G06F 3/1211* (2013.01); *G06F 3/1208* (2013.01); *G06F 3/1247* (2013.01); *G06F 3/1257* (2013.01); *G06F 3/1285* (2013.01)
USPC ............ 358/1.4; 358/1.9; 358/1.18; 358/537; 358/1.13

(58) Field of Classification Search
CPC ... G06F 3/1298; G06F 3/1247; G06F 3/1208; G06F 3/1285; G06F 3/1257; G06F 3/1211
USPC .................. 358/1.9, 1.4, 1.13, 1.18, 537, 452
See application file for complete search history.

(56) References Cited

U.S. PATENT DOCUMENTS

| | | | |
|---|---|---|---|
| 6,216,142 B1* | 4/2001 | Iwasaki ................ | 715/201 |
| 6,976,797 B2* | 12/2005 | Herron ................. | 400/61 |
| 7,839,533 B2* | 11/2010 | Nishide et al. .......... | 358/1.18 |
| 2006/0210296 A1* | 9/2006 | Sakata et al. ........... | 399/82 |
| 2006/0256389 A1* | 11/2006 | Sakata et al. .......... | 358/304 |
| 2007/0229903 A1* | 10/2007 | Sato ................... | 358/1.18 |
| 2008/0266600 A1* | 10/2008 | Itoh ................... | 358/1.15 |

(Continued)

FOREIGN PATENT DOCUMENTS

| JP | 9-222718 A | 8/1997 |
|---|---|---|
| JP | 10-333315 A | 12/1998 |
| JP | 2008-268575 A | 11/2008 |

*Primary Examiner* — Benny Q Tieu
*Assistant Examiner* — Quyen V Ngo
(74) *Attorney, Agent, or Firm* — Sughrue Mion, PLLC

(57) ABSTRACT

A print control device includes a mark information memory, a first print controller, and a second print controller. The mark information memory stores mark information for each type of printer. Upon receiving a printing instruction that specifies a first printer, the first print controller assigns identification information to the print data, combines interpretation result data of the print data and an additional mark for the type of the first printer to create imposition data, supplies the imposition data to the first printer, and saves the interpretation result data in a storage device in association with the identification information. Upon receiving a printing instruction that specifies a second printer, the second print controller acquires the interpretation result data from the storage device, combines the interpretation result data and an additional mark for the type of the second printer to create imposition data, and supplies the imposition data to the second printer.

10 Claims, 10 Drawing Sheets

(56) References Cited

U.S. PATENT DOCUMENTS

2010/0328722 A1* 12/2010 Yasunaga .................... 358/1.15
2011/0286031 A1* 11/2011 Jessen ......................... 358/1.15
2012/0020513 A1*  1/2012 Outram ........................ 382/100

* cited by examiner

NON-PRINTING AREA

FIG. 9

| OUTPUT DESTINATION: | Proof Cut140 ▼ |
|---|---|
| IMPOSITION PATTERN: | 2-UP ▼ |

| DETAILS OF MARKS: 2-UP FOR CUT PAPER | POSITION: |
|---|---|
| ·CORNER CROP MARKS | FOUR CORNERS |
| ·CENTER CROP MARKS | TOP AND BOTTOM |
| ·PHYSICAL PAGE NUMBER | LOWER CENTER |
| ·LOGICAL PAGE NUMBER | LOWER CENTER |
| ·COLOR BAR | AREA BEYOND LEFT PAGE EDGE |
| ·JOB INFORMATION | AREA BEYOND LEFT PAGE EDGE |
| ... ▼ | ... ▼ |

FIG. 10

| JOB ID | | RIPed PAGE DATA |
|---|---|---|
| | PREVIOUS OUTPUT INFORMATION | OUTPUT DESTINATION PRINTER ID |
| | | IMPOSITION PATTERN |
| | | OUTPUT PAPER ATTRIBUTES |
| | | LOGICAL PAGE ATTRIBUTES |
| | | RIPed MARK DATA |

PRINT CONTROL DEVICE AND NON-TRANSITORY COMPUTER READABLE MEDIUM FOR STORING MARK INFORMATION IN ACCORDANCE WITH A TYPE OF PRINTER

CROSS-REFERENCE TO RELATED APPLICATIONS

This application is based on and claims priority under 35 USC 119 from Japanese Patent Application No. 2013-044577 filed Mar. 6, 2013.

BACKGROUND (i) Technical Field

The present invention relates to a print control device and a non-transitory computer readable medium.

(ii) Related Art

In desktop publishing (DTP) systems, generally, document page data created using editing software such as Photoshop (registered trademark) is imposed on a sheet, or signature, using imposition software to generate imposition data. The document data to be input may be in a format specific to editing software that has become the de facto standard, such as the Photoshop Document (PSD) format, or in a standard format such as Portable Document Format (PDF). The imposition data to be output is in a page description language format which is supported by a printer, such as PostScript (registered trademark) or PDF.

The imposition data includes information on marks such as crop marks which are referred to in the bookbinding operation. The imposition software selects necessary marks in accordance with the type of printer in the output destination (in terms of printing method such as the electrophotographic or inkjet method, paper type such as cut paper or continuous paper (or continuous form paper), or any other suitable classification), and arranges the selected marks at appropriate positions according to the dimensions of a document page or the dimensions of paper to be used, thereby creating imposition data.

SUMMARY

According to an aspect of the invention, there is provided a print control device including a mark information memory, a first print controller, and a second print controller. The mark information memory stores, for each type of printer, mark information that defines an additional mark in accordance with the type of printer. Upon receiving a first printing instruction including print data to be printed which is written in a page description language and including specification of a first printer in an output destination, the first print controller assigns identification information to the print data, combines interpretation result data obtained by interpretation of the print data using an interpretation device and an additional mark for the type of the first printer, which is based on the mark information stored in the mark information memory, to create imposition data, supplies the created imposition data to the first printer to print the imposition data, and saves the interpretation result data in a storage device in association with the assigned identification information. Upon receiving a second printing instruction including the identification information assigned to the print data to be printed and including specification of a second printer in an output destination, the second print controller acquires the interpretation result data saved in association with the identification information from the storage device, combines the acquired interpretation result data and an additional mark for the type of the second printer, which is based on the mark information stored in the mark information memory, to create imposition data, and supplies the created imposition data to the second printer to print the imposition data.

BRIEF DESCRIPTION OF THE DRAWINGS

An exemplary embodiment of the present invention will be described in detail based on the following figures, wherein:

FIG. 9 illustrates an example of a setting screen for an output destination and an imposition pattern;

FIG. 10 illustrates an example of a data structure of job data held in a memory device;

DETAILED DESCRIPTION

System Configuration

Figure 1:
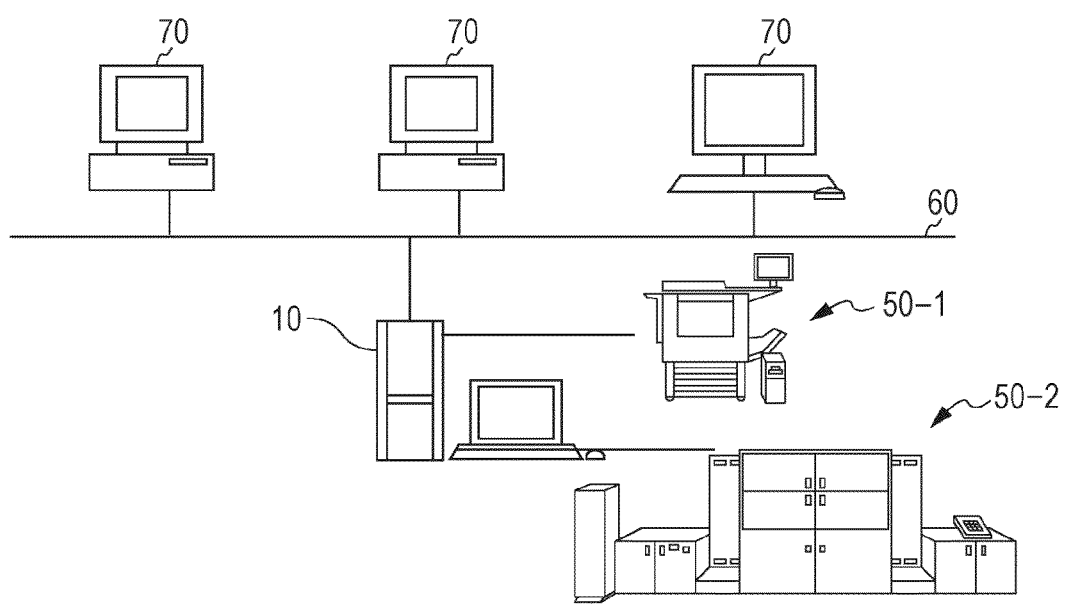
FIG. 1 illustrates an example of a printing system including a controller according to an exemplary embodiment.

FIG. 1 illustrates an example of a printing system including a controller 10 according to an exemplary embodiment.

In FIG. 1, the controller 10 receives a printing instruction including print data to be printed from a client device 70 via a data communication network 60 such as a local area network. The controller 10 controls a printer in accordance with the printing instruction to print the print data. The client device 70 may be a personal computer, a workstation, or the like.

The print data sent from the client device 70 is represented in a page description language format such as PostScript (registered trademark) or PDF. The controller 10 interprets the print data in the page description language format (hereinafter also referred to as "page description language print data") to generate print image data in a raster format or the like which is supported by a printer using the interpretation result, and supplies the generated print image data to a printer to print the print image data onto a sheet.

The controller 10 according to this exemplary embodiment is configured to control multiple printers, and two printers 50-1 and 50-2 (hereinafter individually referred to as a "printer 50" or collectively referred to as "printers 50" unless otherwise individually specified) are connected to the controller 10. The printer 50-1 may be, for example, a comparatively small cut paper printer used in an office, and is used for, for example, comprehensive layout (or comp for short). The printer 50-2 may be, for example, a high-speed printer (which is of the type using, for example, continuous paper) for professional use, and enables higher speed printing than the printer 50-1. Each of the printers 50-1 and 50-2 may include a post-processing device that performs post-processing, such as bookbinding, on printed sheets.

The controller 10 according to this exemplary embodiment has an imposition function for laying out multiple pages (referred to as "logical pages") in print data on a physical sheet page (or a "signature") (hereinafter referred to as a "physical page") for the purpose of bookbinding.

Configuration of Controller

Figure 2:
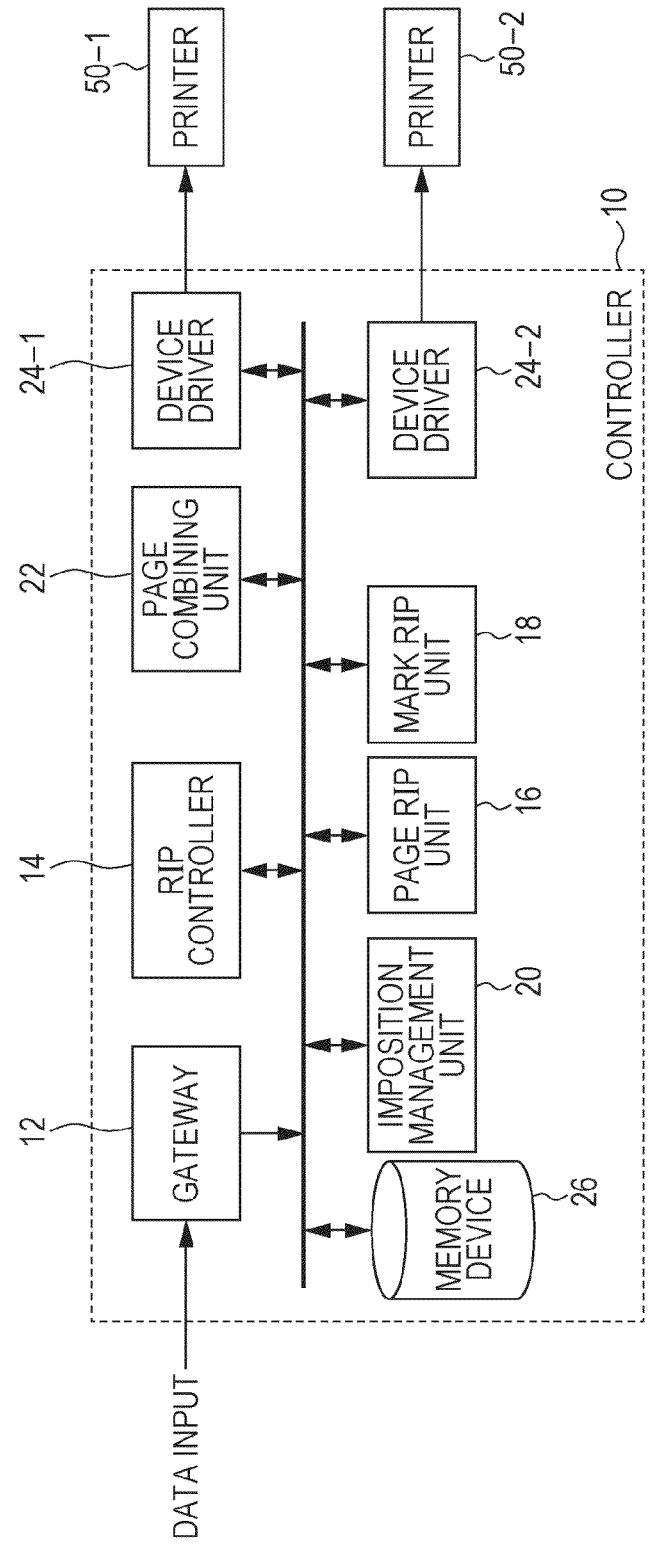
FIG. 2 illustrates an example of an internal configuration of the controller.

FIG. 2 illustrates an example of an internal configuration of the controller 10.

In the configuration illustrated in FIG. 2, a gateway 12 controls data communication via the data communication network 60.

A raster image processor (RIP) controller 14 controls RIP processing to be performed on print data and the like. The RIP processing is a process for interpreting page description language print data and converting the page description language print data into image data in a raster format (bitmap image) (hereinafter referred to as "raster image data" or "raster data") or into data in an intermediate language format which is supported by a printer (hereinafter referred to as "intermediate language data"). The intermediate language format lies between a page description language format and a raster format. If a result of RIP processing is intermediate language data, the intermediate language data as a result of RIP processing is converted into raster data using a device driver 24 (described below) in the controller 10 or using a printer 50 to which the data is supplied. The printer 50 forms an image on a sheet in accordance with the raster data.

The controller 10 according to this exemplary embodiment may be configured to convert page description language data into raster data or intermediate language data in the RIP processing. With the use of an intermediate language that is capable of representing color values in a device-independent color space which is independent of an output device (or printer), the controller 10 may convert the device-independent color values into device-dependent color values that match the color reproduction characteristics of the output device when converting intermediate language data that has undergone RIP processing (hereinafter also referred to as "RIPed data") into raster data. Accordingly, when reprinting is performed using a different output destination, it may be possible to achieve color reproduction that matches the color reproduction characteristics of the different output destination. If the RIPed data is raster data, in contrast, the color values of the individual pixels are values that depend on the output destination device. Hence, when reprinting is performed using a different output destination, there are limitations on the degree to which the color values of the pixels of the RIPed data are corrected so as to conform to the color reproduction characteristics of the different output destination.

The RIP controller 14 controls the overall RIP processing on print data. Specific RIP processing for logical pages in the print data is performed using a page RIP unit 16 and a mark RIP unit 18. The page RIP unit 16 performs RIP processing on each of the logical pages included in the print data. The mark RIP unit 18 performs RIP processing on additional marks contained in imposition (or layout) data. The additional marks are marks to be added to logical page data indicated by print data for checking the quality of the printed product, post-processing such as bookbinding, and other purposes, and include a color patch, crop marks, and a page number. The additional marks will be described in more detail later.

An imposition management unit 20 manages imposition. The term "imposition", as used herein, refers to a process for laying out one or more logical pages on a physical page (that is, arranging one or more logical pages at a specific position or positions on a physical page), and is also referred to as a "layout".

The imposition management unit 20 has page description language data indicating various additional marks, and mark application information for each type of printer 50. The mark application information indicates which additional marks are to be applied for the associated type of printer 50. The details of the mark application information will be described below. The imposition management unit 20 controls the RIP controller 14 and a page combining unit 22 in accordance with an imposition instruction sent from a client device 70 or sent through an operation unit of the controller 10 to perform imposition.

The page combining unit 22 combines a result of RIP processing (referred to as "page data") performed on a logical page by the page RIP unit 16 and results of RIP processing (referred to as "mark data") performed on necessary additional marks by the mark RIP unit 18, in accordance with the control of the imposition management unit 20. That is, the page combining unit 22 imposes (or lays out) the page data of each of the logical pages on (a memory area corresponding to) a physical page, and combines mark data with the imposed data. These processes may not necessarily be performed in such a manner that imposition is followed by the combining of mark data. Any order may be used as long as it is possible to combine a result of imposition and mark data. Data in which a result of imposition and mark data are combined is referred to as "imposition data".

A device driver 24-1 and a device driver 24-2 (hereinafter individually referred to as a "device driver 24" or collectively referred to as "device drivers 24" unless otherwise individually specified) are device drivers configured to control the printer 50-1 and the printer 50-2, respectively. Each of the device drivers 24 controls the corresponding printer 50 to print the imposition data generated by the page combining unit 22 onto a sheet. If the data generated through RIP processing is intermediate language data, the device driver 24 may convert the intermediate language data into raster data. This conversion process may be omitted if the printer 50 is configured to support an intermediate language format.

A memory device 26 is a storage device configured to save a result of RIP processing performed on print data that has been printed. The memory device 26 may be a large-capacity storage device such as a hard disk or a flash memory. In this exemplary embodiment, a result of RIP processing which is saved in the memory device 26 may be used when, for example, print data that has been printed using a certain printer 50 is reprinted using a different printer 50 or is reprinted with an imposition layout changed.

The system configuration and the internal configuration of the controller 10 have been described. The processes of the controller 10 will be described in detail below after the description of additional marks.

Additional Marks

Additional marks to be added for imposition include additional marks which are common regardless of the type of printer (referred to as a "common marks") and additional marks that depend on the type of printer. The term "type of printer", as used herein, refers to the type of printer that is basically determined by, in combination, printing method (such as the electrophotographic or inkjet method) and paper type, that is, whether cut paper or continuous paper is to be used. The "type" of printer is determined by the classification described above since the additional marks to be used differ depending on the printing method and whether cut paper or continuous paper is to be used.

The common marks that do not depend on the type of printer include, for example, corner crop marks (at the four corners of a sheet), center crop marks (at the top and bottom of a sheet), logical page numbers, spine marks, and collating marks.

The additional marks specific to the electrophotographic method may include, for example, a color patch (also referred to as a color bar). A separator and an ink jet bar are available as the additional marks specific to the inkjet method. The additional marks that are employed in accordance with the printing method are hereinafter referred to as "printing-method-specific marks".

The additional marks used for cut paper may include, for example, job information, blind folio, and notes. The additional marks used for continuous paper may include, for example, offset marks, page codes, job marks, copy marks, and registration marks. The additional marks that are employed in accordance with the type of output paper are hereinafter referred to as "paper-specific marks".

The controller 10 holds, for each type of printer, that is, for each combination of printing method and paper type, information indicating which additional marks are to be used for the associated type of printer. The controller 10 selects the additional marks to be used for the output destination printer in accordance with the held information. If the additional marks to be used are of the type that depends not only on the type of printer but also on the imposition pattern, the imposition pattern, the controller 10 may specify additional marks in accordance with a combination of the type of printer and the imposition pattern. To this end, the controller 10 may hold information specifying the additional marks to be used in terms of the combination of the type of printer and the imposition pattern.

Figure 3:
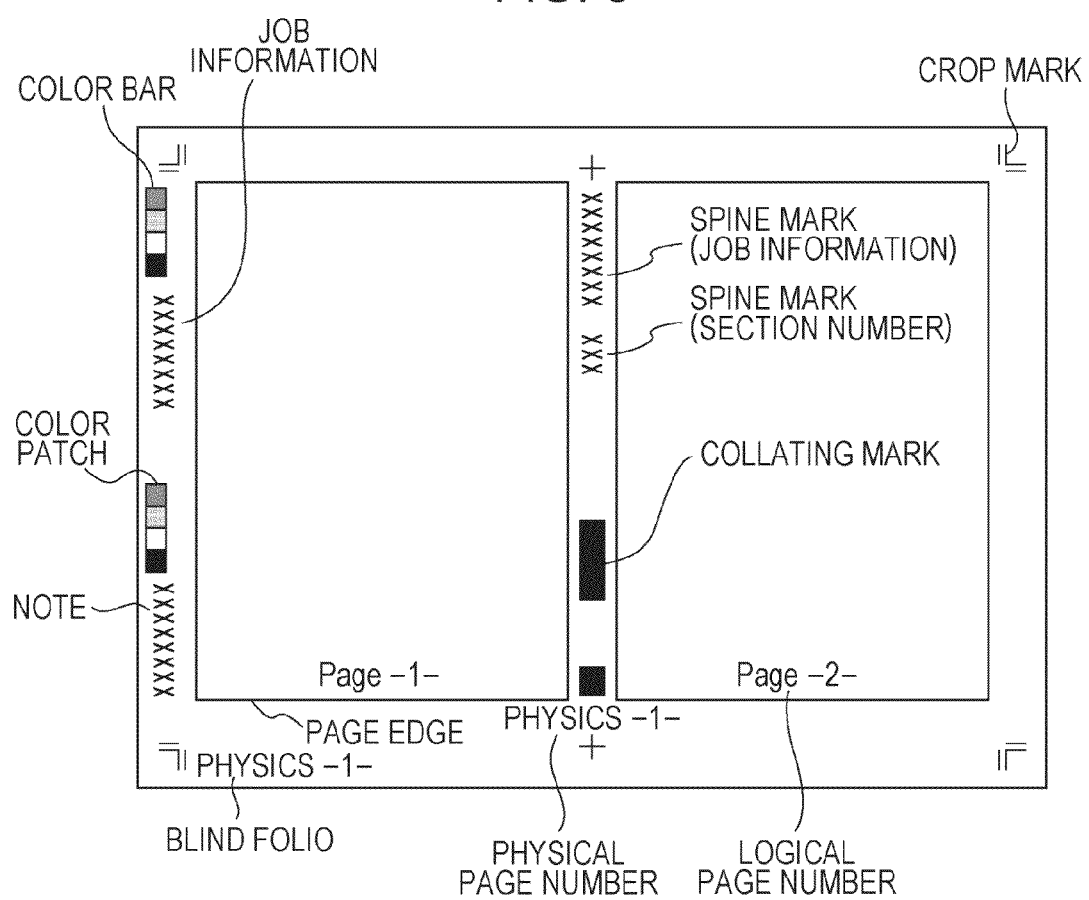
FIG. 3 illustrates an example of additional marks for an electrophotographic printer that uses cut paper in a case where imposition is performed using a 2-up imposition pattern.
Figure 4:
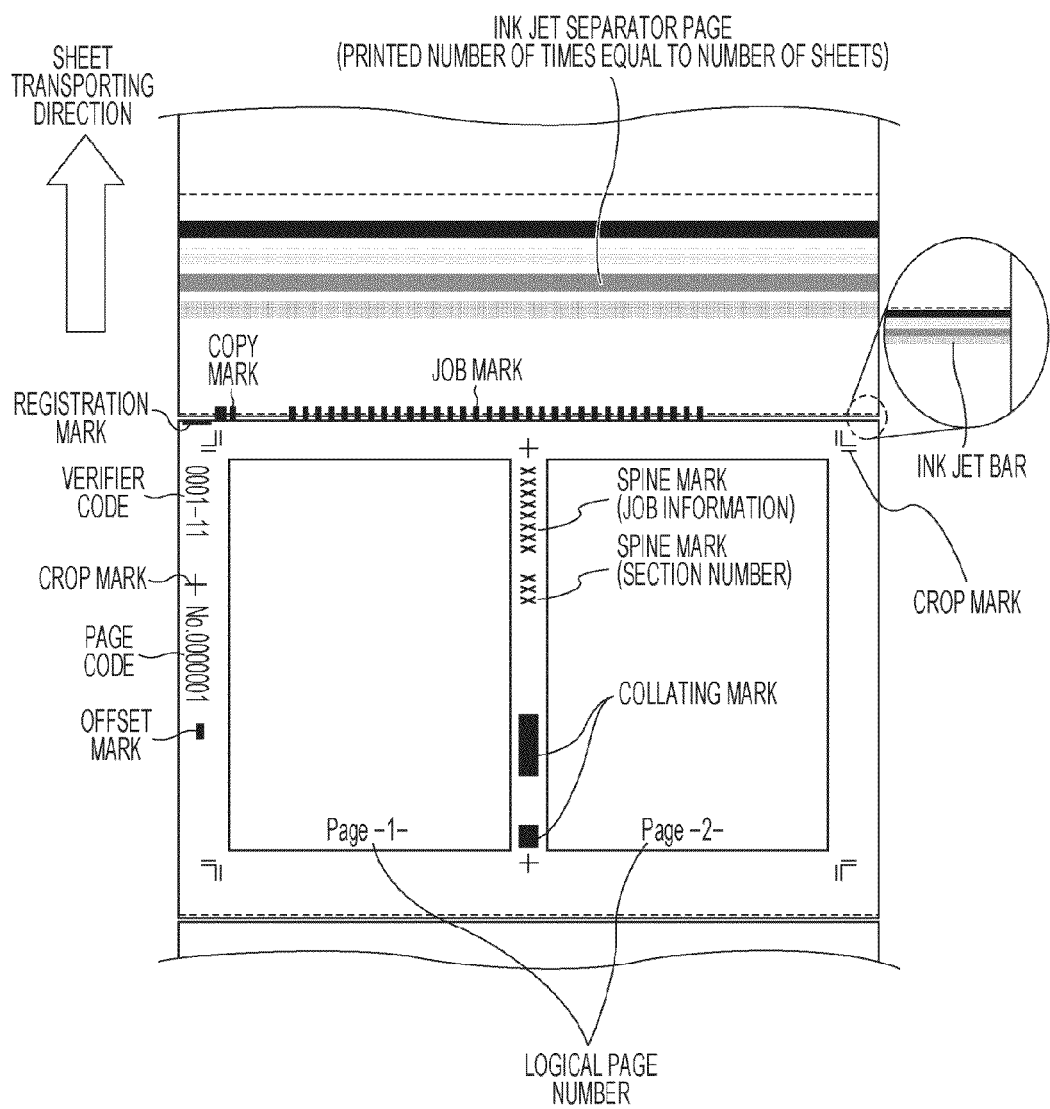
FIG. 4 illustrates an example of additional marks for an inkjet printer that uses continuous paper in a case where imposition is performed using a 2-up imposition pattern.

FIG. 3 illustrates an example of additional marks for an electrophotographic printer that uses cut paper in a case where imposition is performed using a 2-up imposition pattern. FIG. 4 illustrates an example of additional marks for an inkjet printer that uses continuous paper in a case where imposition is performed using a 2-up imposition pattern.

Each of the additional marks includes variable information that varies in accordance with the attributes (for example, page size and page number) of a logical page in print data. Each of the additional marks further includes variable information that varies in accordance with an imposition pattern. The imposition pattern is a pattern indicating how many logical pages are to be arranged on one physical page and in which layout the logical pages are to be arranged. Examples of the imposition include 2-up imposition (the imposition of two pages on each side of a sheet) and 4-up imposition. Further, each of the additional marks for cut paper and for continuous paper includes variable information that varies in accordance with paper attributes (such as a paper size). The variable information on an additional mark includes, for example, the position at which the additional mark is arranged on a physical page, values such as a page number to be printed and a job number, and so forth.

Figure 5:
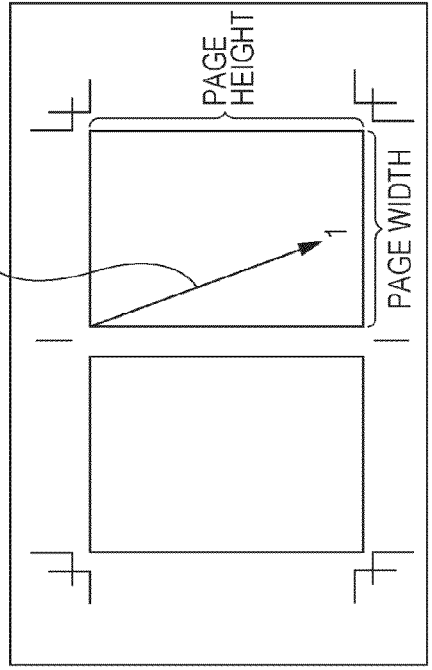
FIG. 5 illustrates an example of additional-mark variable information that varies in accordance with logical page attributes.

FIG. 5 illustrates an example of variable information that varies in accordance with logical page attributes. In the illustrated example, the coordinates of the position of a page number to be arranged at the lower center of a logical page vary in accordance with the size (a set of page height and page width) of the logical page.

Figure 6:
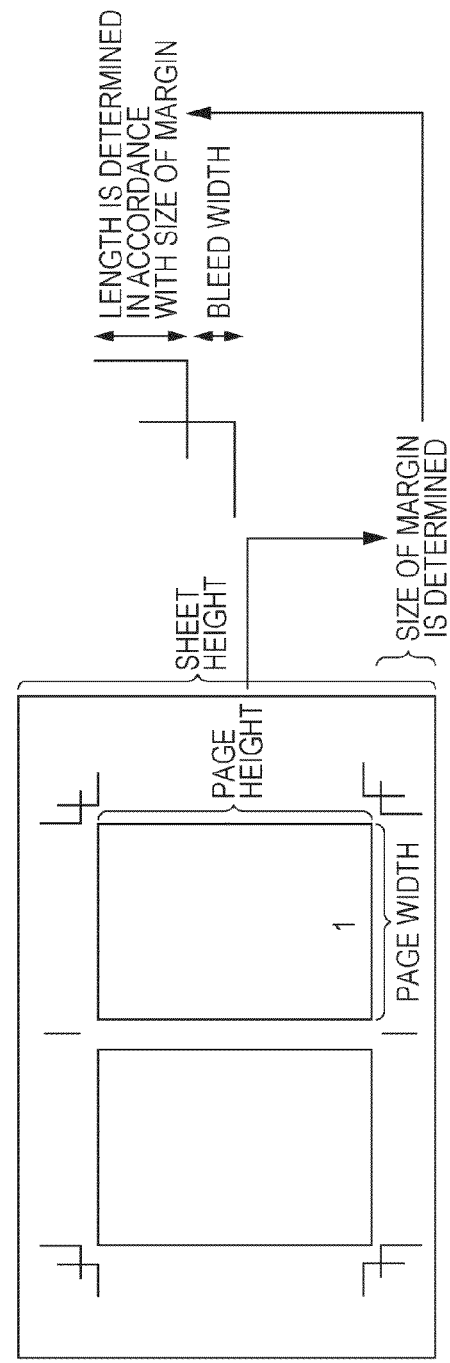
FIG. 6 illustrates an example of additional-mark variable information that varies in accordance with paper attributes.

FIG. 6 illustrates an example of variable information that varies in accordance with paper (or physical page) attributes. In the illustrated example, the size of the margins and the shape of the corner crop marks (the degree to which two inverse L shapes overlap) are determined in accordance with a sheet height and a preset bleed width (in a case where the size of the logical page is determined in advance), and the length of the corner crop marks is determined in accordance with the determined size of the margins.

In the foregoing description, the "type" of printer is determined in accordance with a combination of a printing method (such as the electrophotographic or inkjet method) and the type of paper to be used (such as cut paper or continuous paper). To be more specific, the "type" of printer may be the product model of the printer. The following description will be made of a relationship between the "type" of printer in the context described above and a layout of additional marks.

Figure 7:
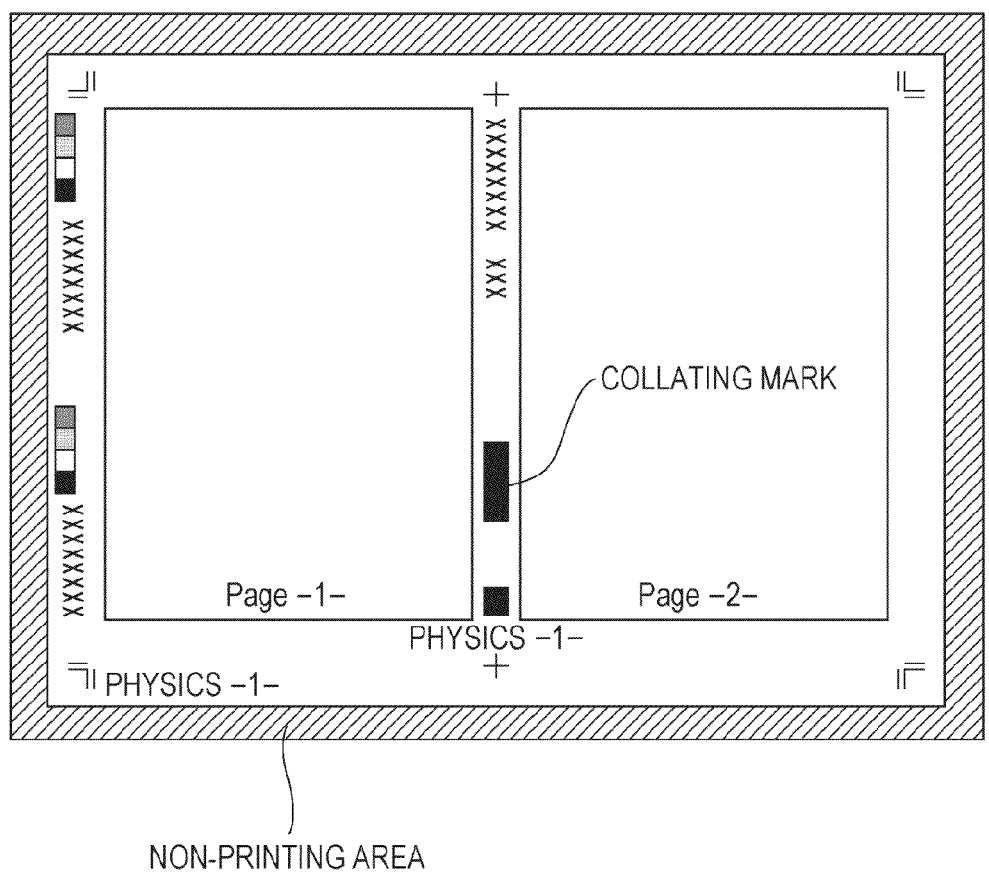
FIG. 7 illustrates the position of a non-printing area for cut paper.
Figure 8:
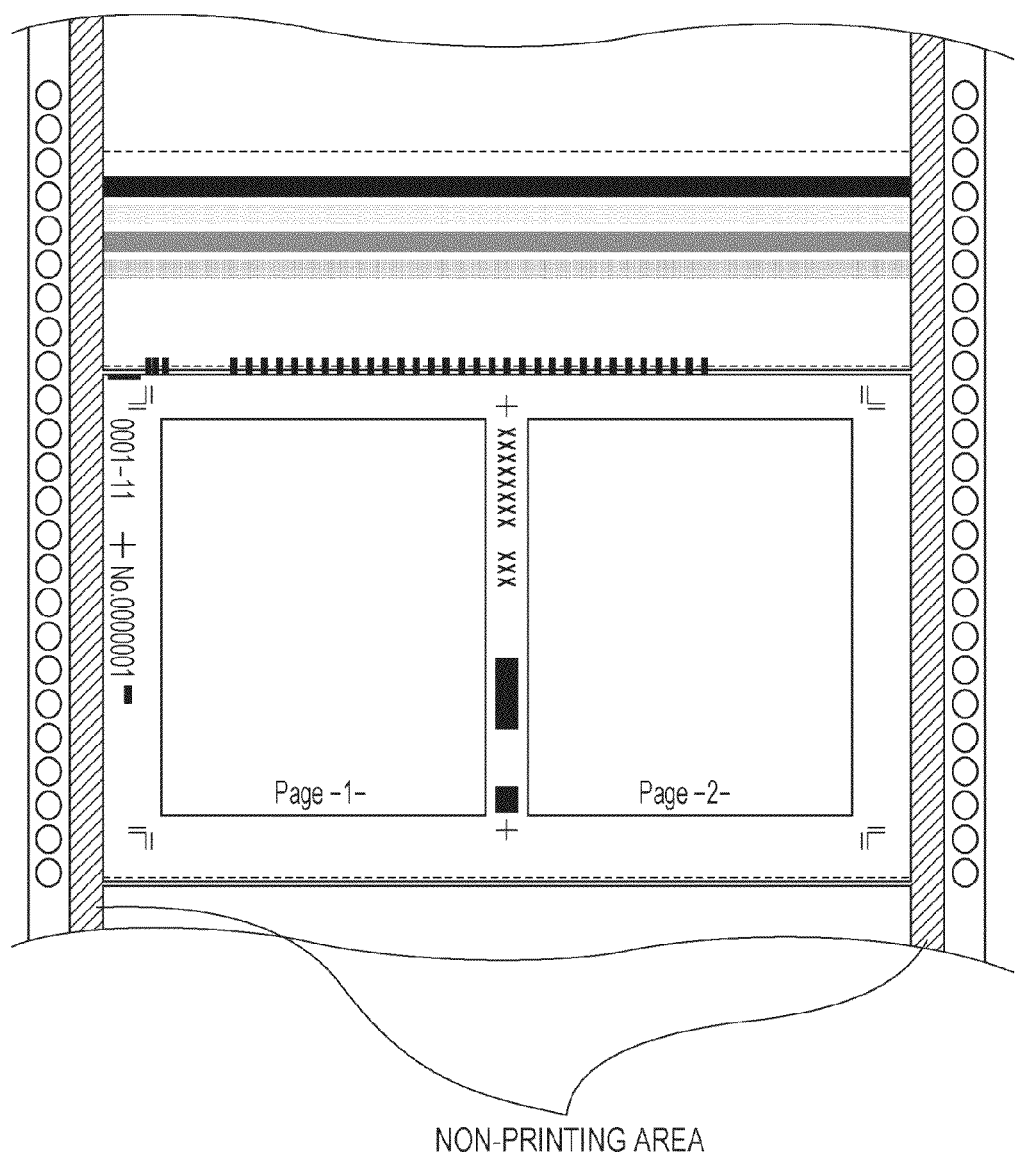
FIG. 8 illustrates the positions of non-printing areas for continuous paper.

For example, a printer is not configured to print on all the area of a sheet to be used. There are non-printing areas on the top, bottom, right, and left edges of a sheet (in the case of cut paper) or on both ends of the short sides of a sheet (in the case of continuous paper). FIG. 7 illustrates a non-printing area for cut paper, and FIG. 8 illustrates rough positions of non-printing areas for continuous paper.

The position and size of a non-printing area in a sheet may differ depending on a printer model. That is, the positions and sizes of the printing and non-printing areas in a sheet may differ between printer models even if the printer models are electrophotographic printers and handle cut paper. Due to such a difference in terms of the position and size of the printing and non-printing areas between printer models, if pages and additional marks are laid out in a standard manner in accordance with an imposition pattern specified for a specified paper size, some of the additional marks may lie in the non-printing area depending on the printer model in the output destination. The additional marks that lie in the non-printing area are not printed.

Some of the additional marks that lie in the non-printing area may not influence downstream operations (such as proofing of a printed copy and post-processing) if the additional marks are not printed. Printing may be performed without changing the layout of such additional marks, or printing may be performed by trimming (or removing) an image portion that lies in the non-printing area.

Other additional marks that lie in the non-printing area may become meaningless if the additional marks are not printed. The processing described above may not be appropriate for such additional marks. Such additional marks are corrected in the following way: The sizes of the marks are reduced or the positions of the marks are shifted so that the marks are printed to identify the meaning of the marks.

In an exemplary embodiment, accordingly, a rule stating which correction process is to be performed and on which additional mark the correction process is to be performed may be registered in the controller 10 in accordance with a combination of printer model, paper size, logical page size, imposition pattern, and so forth. When imposition is performed, an additional mark that needs to be corrected is subjected to the associated correction process in accordance with the rule based on the combination used in the imposition.

Some printers are configured to handle both continuous paper and cut paper. The "type" of each of the printers is determined by printing method (such as the inkjet or electrophotographic method). Then, additional marks to be added for imposition are specified in accordance with, for example, a combination of the "type" of the printer and the type of output paper specified by a user, that is, continuous paper or cut paper.

Some printers may have multiple print engines of different types (for example, a printer having both an electrophotographic print engine and an inkjet print engine). In this case, the controller 10 not only receives the specification of an output destination printer but also receives the specification as to which print engine in the printer to use, and determines the "type" of the output destination printer in accordance with the specified print engine.

Print Settings

A user specifies the printer 50 in the output destination and an imposition pattern on a user interface (UI) screen displayed on a display of a client device 70 or a display of the controller 10. FIG. 9 schematically illustrates an example of the UI screen. In the illustrated example, the user selects the printer 50 in the "output destination" and an "imposition pattern" from a pull-down menu that presents various options. In the illustrated example, a printer 50 having identification name "ProofCut140" is selected as the output destination, and "2-up" (2-up imposition) is selected as the imposition pattern. The controller 10 has at least information on each of the printers 50 connected to the controller 10, which includes the printing method (such as the electrophotographic or inkjet method) and the type of paper to be used (such as cut paper or continuous paper). The controller 10 determines the "type" of the selected output destination printer (here, the combination of printing method and paper type) in accordance with the information. In an example, which additional mark is to be added for imposition is determined in accordance with the determination result. In another example, additional marks to be added are determined in accordance with the combination of the determination result and the selected imposition pattern. A list of the mark names of the additional marks extracted as objects to be added is displayed in the "Details of Marks" column in the UI screen illustrated by way of example in FIG. 9. In the illustrated list, each of the marks is associated with the relative position of the mark on a physical page (or on a single page of a sheet), and the relative positions are presented to the right of the mark names. The relative positions are determined in accordance with the type of printer and the imposition pattern. The absolute positions on a physical page which correspond to the relative positions are variable information that is determined in accordance with at least one value among the logical page attributes, the physical page attributes, the imposition pattern, and so forth.

Although not illustrated in FIG. 9, if the printer in the output destination is configured to handle multiple sheets having different sizes, the size of a sheet to be used may be specified on the UI screen.

In an example where the "type" of printer is the product model of the printer, once an output destination printer is specified, the product model of the printer is identified in accordance with the information held in the controller 10. Then, additional marks to be added are identified in accordance with the combination of the printing method and the type of paper to be used. In addition, a correction process to be performed on each of the additional marks to address additional marks in the non-printing area is identified by further taking into account at least one of the specified paper size and imposition pattern.

Reuse of RIPed Data

In this exemplary embodiment, the result of RIP processing performed on print data is saved in the memory device 26 to reuse the result.

In a certain situation, for example, preliminary printing is first performed using the small printer 50-1 for test prints, a comprehensive layout (comp), and other purposes, and then actual printing is performed using the large printer 50-2. In this case, data obtained as a result of RIP processing performed on print data generated through RIP processing in the preliminary printing (also referred to as "RIPed data") is saved in the memory device 26. The RIPed data saved in the memory device 26 is reused in the actual printing performed by the printer 50-2, instead of the same print data being subjected to RIP processing again. If the printers 50-1 and 50-2 are of different "types", additional marks to be added for imposition differ. In the reuse process, accordingly, the RIPed data of the print data (that is, page data indicating each logical page) is imposed in accordance with the specified imposition pattern, and information on additional marks determined in accordance with the type of the printer 50 in the output destination is combined with the imposed data.

While additional marks to be used differ depending on the "type" of printer, not all the additional marks to be used may differ. Some of the additional marks may also be used for other printers. Accordingly, RIPed data of additional marks which is generated in the imposition process for a certain output destination printer may be saved to reuse the RIPed data. That is, when the same print data is to be output using a different printer, an additional mark usable for the different printer is not subjected to RIP processing. Instead of this, the RIPed data of the additional mark, which is saved, is reused.

The RIPed data of an additional mark may be reused by the reuse of the shape and color of the additional mark or by the reuse of information on the arrangement position of the additional mark on a sheet in addition to the reuse of the shape and color of the additional mark. The former case may have higher flexibility of reuse since if a set of shape and color parameters of an additional mark is commonly used, the set of parameters may be used even if the position of the additional mark differs. However, the processing load required for imposition may be higher than that in the latter case because imposition involves the combining of the saved information on the shape and color of the additional mark with the arrangement position of the additional mark in the data obtained as a result of imposition performed for a new output destination printer. The latter case may have lower flexibility of reuse than the former case, but may have lower processing load required for imposition than the former case. The controller 10 may support one of the former and the latter, or may implement both of them and a user may select one of them.

For example, a case is assumed in which the same output destination printer is used in the previous and current printing operations, and the same type (including size) of paper is used in the previous and current printing operations. In this case, all the results of RIP processing performed on all the additional marks, including information on the arrangement positions of the additional marks on a sheet, may be reused. The processing procedure illustrated in FIG. 12, described below, is an example in which the reuse of the results of RIP processing performed on additional marks is limited to the case described above.

The reuse of the results of RIP processing performed on additional marks may be controlled in more detail. In this case, for example, the controller 10 may hold, for each pair of "types" of printers (that is, each pair of "printing method and paper type (cut paper/continuous paper)"), mark reusability information indicating which additional mark is reusable between the two printers in the pair. The controller 10 may refer to the mark reusability information to determine which additional mark is reusable when the result of RIP processing is to be reused.

The reusability of each of the additional marks may depend not only on a combination of types of two printers but also on an imposition pattern. In this case, mark reusability information indicating which additional mark is reusable may be prepared for each pair of units, each unit being a combination of "type" of printer and imposition pattern.

In the case of, for example, the reuse of RIPed data, including the reuse of information on the arrangement position of an additional mark in addition to the reuse of the shape and color of the additional mark, mark reusability information indicating which additional mark is reusable may be prepared for each pair of units, each unit being a combination of "type" of printer, imposition pattern, and logical page attributes (for example, page size) and/or paper attributes (for example, paper size) that may influence the arrangement position of the additional mark.

In order to reuse print data and RIPed data of an additional mark in the manner described above, in an example, the controller 10 creates and holds job data having a data structure illustrated by way of example in FIG. 10. In the illustrated example, data for each "job" includes a "job ID", "RIPed page data", and "previous output information".

The term "job", as used herein, refers to print data. When a piece of print data is input to the controller 10, a unit of management, called a "job", corresponding to the input piece of print data is generated. A print output process in which RIPed data of the same print data is reused is handled as one "output" included in the "job" of the print data.

The "job ID" is identification information for identifying the job. For example, the controller 10 displays a list of job IDs of pieces of job data that are saved in the memory device 26 to allow a user to select a job to be output from the displayed list. Alternatively, job names that are recognized by a person (for example, names chosen by a user) may be registered in association with job IDs, and displayed in a list format. Other attribute information on the jobs (such as the names of the users who first entered the pieces of print data, and the dates and times of entry) may be displayed together with the job IDs or job names in a list format.

The "RIPed page data" is data obtained as a result of RIP processing performed on each page in the print data. Whether the RIPed page data is in a raster format or in an intermediate language format depends on whether the page RIP unit 16 is configured to support conversion into raster data and intermediate language data.

The "previous output information" is information indicating a history of the printer 50 from which the job (or print data) was previously printed. The "previous output information" includes the following items: "output destination printer ID", "imposition pattern", "output paper attributes", "logical page attributes", and "RIPed mark data". The "output destination printer ID" is identification information that identifies the output destination printer from which the job was previously output, and the "imposition pattern" is information that specifies an imposition pattern used for the output of the job. The "output paper attributes" are attribute information on the paper used for the output of the job, and include information such as cut paper or continuous paper and paper size. The "logical page attributes" are the attributes of a logical page used for the output of the job, and include information such as page size. The "RIPed mark data" is RIPed data of the additional mark data used for the output of the job.

The "previous output information" may include other information such as the date and time of the previous output and identification information that identifies a user who sent an output instruction.

The job data may contain not only information on the previous output but also output history information on the previous multiple output operations (the content of which may be similar to that of the "previous output information" in the example illustrated in FIG. 10). In this case, when a user selects a job to be output on a UI screen provided by the controller 10, the controller 10 creates a list of history records of previous output operations from the job data of the selected job (for example, a list of pieces of attribute information such as dates and times, imposition patterns, and output destinations) to allow a user to select from the list the output record for which the user wishes to reuse information.

In a system in which RIPed mark data is not reused, the "previous output information" may not necessarily be recorded.

Example of Processing Procedure of Controller

Next, an example of the processing procedure of the controller 10 will be described with reference to FIGS. 11 and 12.

Figure 11:
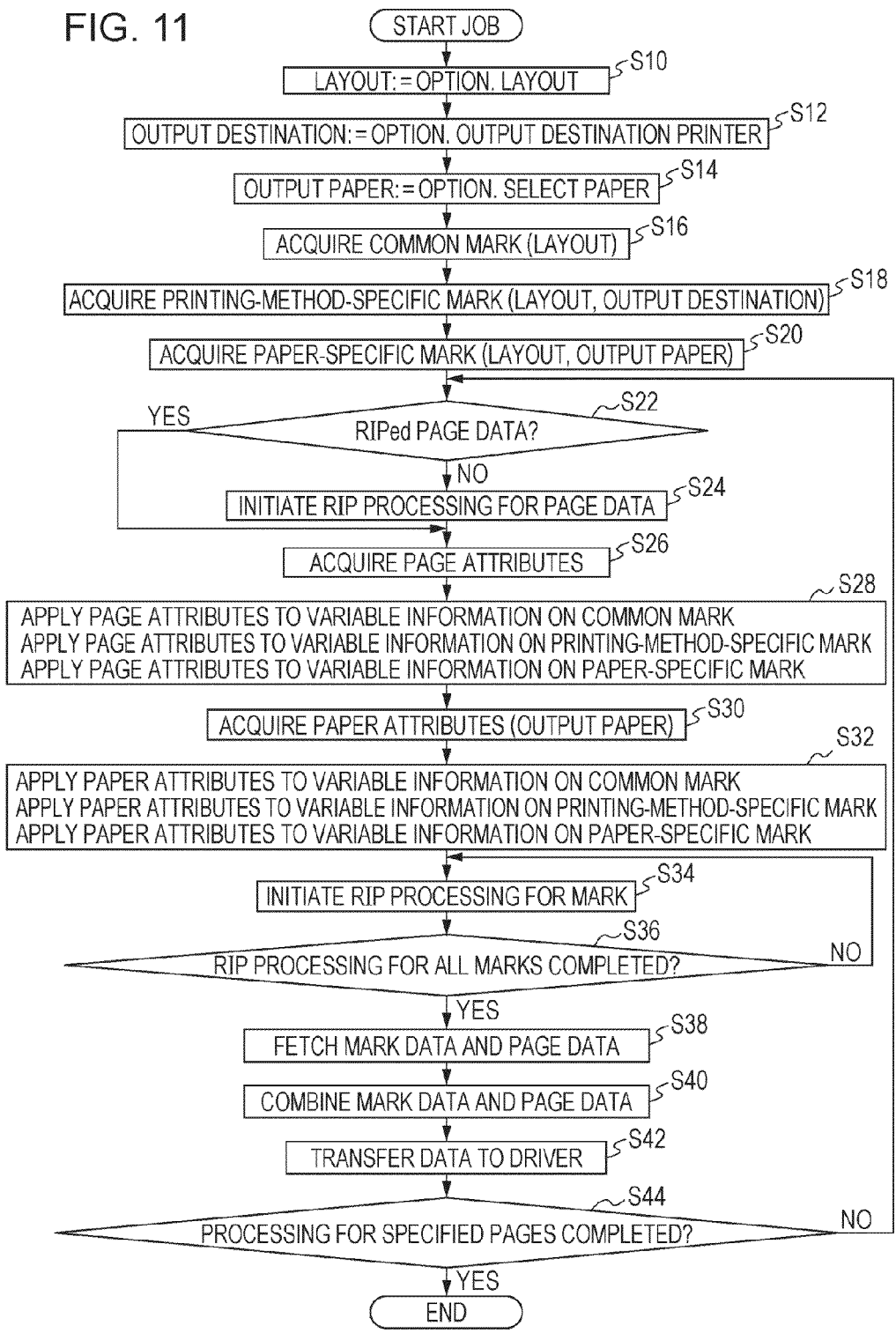
FIG. 11 illustrates an example of a processing procedure for initially imposing print data and printing the print data.

FIG. 11 illustrates a processing procedure for initially printing specified print data using the controller 10.

In this process, a user specifies print data to be printed on a UI screen displayed on the display of the client device 70 or on the display of the controller 10. The controller 10 may have a function for performing RIP processing on the print data without printing the print data, and saving page data obtained as a result of RIP processing in the memory device 26. In this case, on the UI screen on which print data is specified, print data for which the result of RIP processing has been saved in the memory device 26 is selectable as an object to be printed. Document data (which has not undergone RIP processing) that exists in a client device 70 may also be specified on the UI screen as an object to be printed. In this case, a driver in the client device 70 converts the document data into page description language print data, and transmits the page description language print data to the controller 10.

Although not illustrated in the drawings, some of the pages in the print data may be specified as objects to be printed. In this case, the controller 10 receives the specification as to which page is to be printed from a user, and stores the page or pages to be printed.

Then, the controller 10 provides the user with a setting UI screen on which options (or candidates) of each of a layout (or an imposition pattern), an output destination printer, and output paper attributes (such as paper size) are presented, and receives the selection of the values of the individual items on the UI screen (S10 to S12). The order of the processes of S10 to S12 is not limited to that illustrated in FIG. 11. In FIGS. 11 and 12, the expression "OPTION. **" (** denotes the name of a variable) represents the value of the variable selected in the input options. For example, the expression "LAYOUT:=OPTION. LAYOUT" represents the substitution of the value selected by the user from the "layout" options into the variable "layout". In the illustrated example, when an output destination printer is specified, the type of output paper, namely, cut paper or continuous paper, is determined in accordance with the printer. On the UI screen, output paper attributes are specified by specifying more detailed attributes, such as the size of paper to be used in the current operation, from among the type of output paper determined in the manner described above.

Then, the controller 10 acquires data of common marks, printing-method-specific marks, and paper-specific marks that are to be used for imposition from a database of additional marks in accordance with the settings set by the user on the setting UI screen (S16 to S20). The database of additional marks is incorporated in the controller 10 or is placed in a location accessible via the network 60. The processes of S16 to S20 may not necessarily be performed in the order illustrated in FIG. 11. The common marks to be used are determined in accordance with, for example, the selected layout. The printing-method-specific marks to be used are determined in accordance with the selected layout and the printing method of the output destination printer. The paper-specific marks to be used are determined in accordance with the selected layout and the paper type (such as continuous paper or cut paper) of the selected output destination printer. In the illustrated example, by way of example, the data of each of the additional marks to be acquired is page description language data.

Then, the controller 10 determines whether or not the initial page in the print data to be printed has undergone RIP processing (S22). If the initial page has not undergone RIP processing, the controller 10 controls the page RIP unit 16 to perform RIP processing on the print data of the current page (S24). If the initial page has undergone RIP processing (for example, in a case where the RIP processing of the print data has been completed before the current output process starts), the controller 10 skips the RIP processing for the current page (S24).

Then, the controller 10 acquires the page attributes (such as page size) of the current page (S26). The page attributes may be specified in the print data, or may be specified by a user on the setting UI screen displayed on the display of the client device 70 or on the display of the controller 10. Then, the controller 10 applies the values of the page attributes to variable information on the common marks, printing-method-specific marks, and paper-specific marks acquired in S16 to S20 (S28). Accordingly, the values of the parameters that depend on the page attributes among the parameters of the marks are set.

Then, the controller 10 acquires the output paper attributes (such as paper size information) set in S14 (S30). Then, the controller 10 applies the values of the paper attributes to variable information on the common marks, the printing-method-specific marks, and the paper-specific marks (S32). Accordingly, the values of the parameters that depend on the output paper attributes among the parameters of the marks are set.

After that, the controller 10 controls the mark RIP unit 18 to execute RIP processing on each of the additional marks for which the values of the variable information are determined in S28 and S32 (S34). Then, the controller 10 waits for the completion of the RIP processing of the additional marks to be used (and the RIP processing for a page if RIP processing is performed on the page in S24) (S36). After the completion of the RIP processing, the controller 10 fetches the mark data (that is, the RIPed data of the additional marks) and page data (that is, the RIPed data of the page), which are generated through RIP processing (S38). Then, the controller 10 imposes and combines the mark data and the page data in accordance with the specified layout (or imposition pattern) (S40), and transfers the data obtained as a result of combining, or imposition data, to the device driver 24 corresponding to the specified output destination printer (S42). The device driver 24 transfers the received imposition data to the corresponding printer 50 so that the printer 50 executes a printing process. In a case where a correction process for the arrangement positions of the additional marks is to be performed in accordance with the product model of the output destination printer, the correction process may be performed in, for example, S40.

In a case where multiple logical pages are to be imposed on a physical page, the processes of S38 to S42 may be executed when the results of RIP processing performed on the logical pages for one physical page are obtained in accordance with the imposition pattern.

After the process of S42, the controller 10 determines whether or not the printing of all the logical pages specified by the user has been completed (S44). If the printing has not been completed, the controller 10 returns to S22, and processes the subsequent logical page. If the printing has been completed, the current specified printing (or output) process ends.

An example of the processing procedure for initially printing print data using the controller 10 has been described.

Next, an example of the procedure of a re-output process using history information on the previous output operation will be described with reference to FIG. 12.

A list of jobs saved in the memory device 26 is displayed on a UI screen displayed on the display of the client device 70 or on the display of the controller 10. When a user selects a job that has been output (that is, a job for which the "previous output information" has been recorded in the job data) from the displayed list of jobs, the procedure illustrated in FIG. 12 is started. In the illustrated procedure, the controller 10 sets the value of the output destination printer ID in the "previous output information" on the job to be re-output (see FIG. 10), in the variable "previous output destination" (S50). In addition, the controller 10 receives the specification of the current output destination printer and the attributes (such as size) of paper to be used for output on the setting UI screen. In the illustrated example, by way of example, a layout (or imposition pattern) that is the same as that used in the previous output operation is used.

The controller 10 sets the printer ID of the current specified output destination in the variable "current output destination" (S52). Then, the controller 10 determines whether or not the value of the "previous output destination" is equal to the value of the "current output destination" (S54).

If the determination result of S54 is negative (NO), that is, if the current output destination is different from the previous output destination, the controller 10 sets the value of the selected output paper attributes (classification such as paper size) in the variable "output paper" (S56). In addition, the controller 10 acquires the printing-method-specific marks corresponding to the current output destination and the layout (S58) and the paper-specific mark corresponding to the current specified output paper and the layout (S60).

Then, the controller 10 acquires the page attributes of the initial page of the job to be re-output (print data) (S62), and applies the acquired page attributes to variable information on the printing-method-specific marks and the paper-specific marks (S64). Then, the controller 10 acquires the output paper attributes (such as paper size) from the variable "output paper" set in S56 (S76), and applies the output paper attributes to variable information on the common marks, the printing-method-specific marks, and the paper-specific marks (S78). After that, the controller 10 performs RIP processing on the page description language data of each of the additional marks for which the page attributes and the paper attributes are applied to the variable information (S80). At the time when the RIP processing for all the additional marks is completed (the determination result of S82 is positive (YES)), the controller 10 fetches the mark data and page data, which are results of RIP processing (S84), and imposes and combines the mark data and the page data (S86). The page data is acquired from the "RIPed page data" (see FIG. 10) in the "previous output information" on the job, which is saved in the memory device 26.

Then, the controller 10 transfers the imposition data obtained through the combining process to the device driver 24 corresponding to the current output destination printer so that printing is executed (S88). If the printing of all the specified pages has not been completed (the determination result of S90 is negative (NO)), the controller 10 returns to S62 (if the determination result of S54 is negative (NO)) or S76 (if the determination result of S54 is positive (YES)), and processes the subsequent logical page.

In this manner, in the illustrated example, if the previous and current output destination printers are different, the data of printing-method-specific marks and the data of paper-specific marks are acquired again, and the values of the page attributes are reflected in variable information on each of the marks. Accordingly, the printing-method-specific marks and paper-specific marks for the current output destination printer are subsequently subjected to the RIP processing.

If the determination result of S54 is positive (YES), that is, if the current output destination is identical to the previous output destination, the controller 10 sets the values of the specified output paper attributes in the variable "output paper" (S66). The controller 10 also sets the "output paper attributes" in the "previous output information" on the job (that is, the paper attributes selected in the previous output operation) in the variable "previous output paper" (S68). Then, the controller 10 determines whether or not the output paper attributes (such as paper size) for the current output operation are equal to those for the previous output operation (S70).

If the determination result of S70 is negative (NO), that is, if the output paper attributes for the current output operation are different from those for the previous output operation, the controller 10 acquires the data of the paper-specific marks corresponding to the current output paper and the layout (S72). Then, the controller 10 acquires the output paper attributes (such as paper size) from the variable "output paper" set in S66 (S76), and applies the output paper attributes to variable information on the common marks, the printing-method-specific marks, and the paper-specific marks (S78). The subsequent processes of S80 to S90 are similar to those described above in a case where the determination result of S54 is negative (NO).

If the determination result of S70 is positive (YES), that is, if the current output paper attributes are identical to the previous output paper attributes, the controller 10 reuses the results of RIP processing performed on the additional marks in the previous output operation (that is, the "RIPed mark data" in the "previous output information" illustrated in FIG. 10). Hence, the controller 10 skips the processes of S72 to S82. In S84, the controller 10 fetches the RIPed page data of the current page and the RIPed mark data from the job data of the job in the memory device 26, and imposes and combines the RIPed page data and the RIPed mark data to generate imposition data (S86). Then, the controller 10 sends the imposition data to the output destination printer via the corresponding device driver 24 so that printing is performed (S88). If the output of up to the specified last logical page has not been completed (the determination result of S90 is negative (NO)), the controller 10 returns to S62 or S76, and processes the subsequent logical page.

An example of the procedure of the re-output process using the history information on the previous output operation has been described with reference to FIG. 12.

Figure 12:
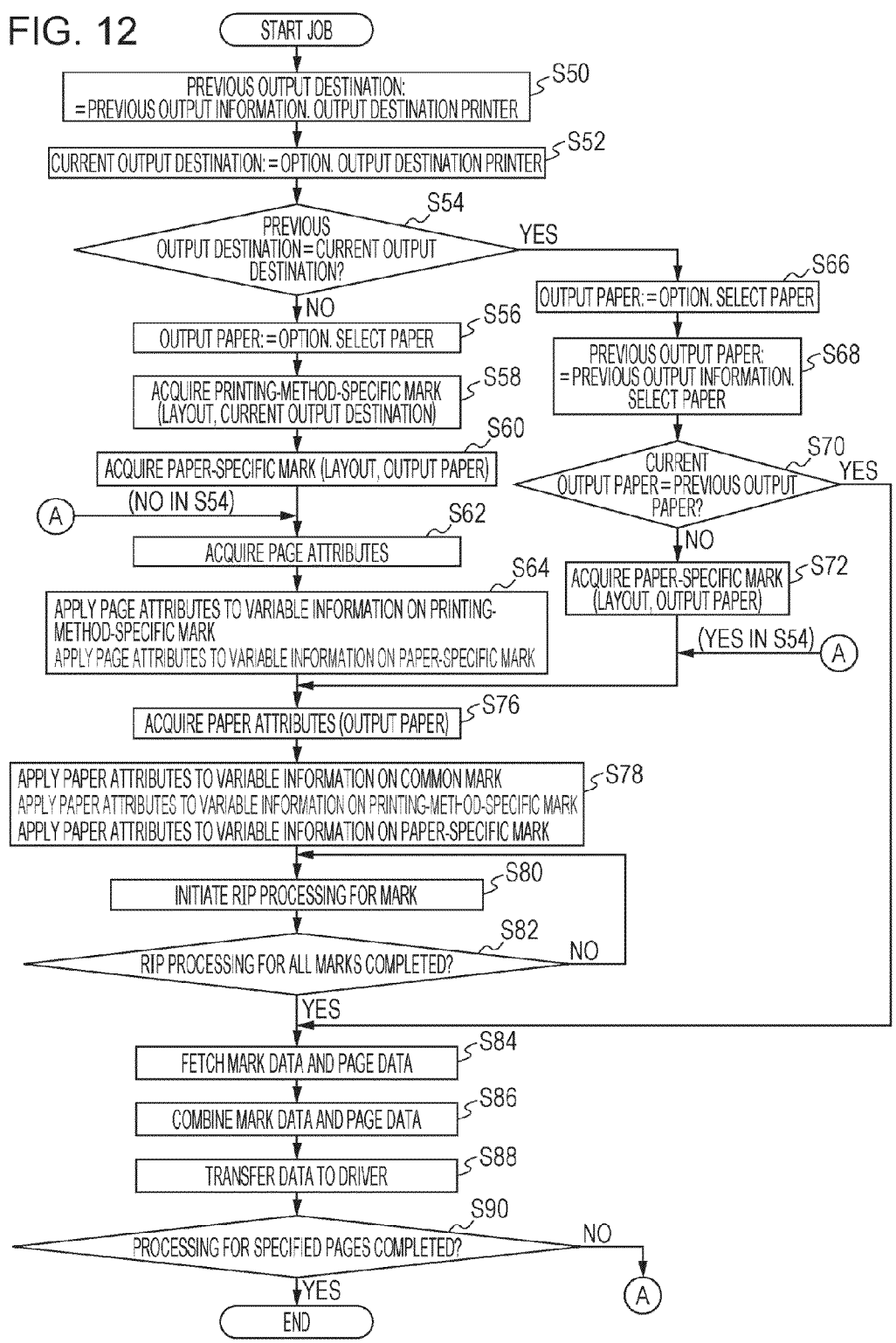
FIG. 12 illustrates an example of a processing procedure for reprinting previously imposed print data.

In the example illustrated in FIG. 12, the previous mark data (that has undergone RIP processing) is reused for the current output operation in a case where the output destination printer in the previous output operation is identical to the output destination printer in the current output operation and in a case where the output paper attributes (such as paper size) for the current output operation are identical to those for the previous output operation. In this case, the additional marks of the same types as those in the previous output operation may be laid out at the same positions on a physical page, and it is thus possible to reuse all the RIPed mark data in the previous output operation.

However, the method for reusing the previous RIPed mark data is not limited to such a method in which all the RIPed mark data is collectively reused. Alternatively, for example, if the previous and current output destination printers use the same printing method, the result of RIP processing on each of the printing-method-specific marks in the previous output operation may be reused in the current output operation. Similarly, if the previous and current output destination printers use the same paper type (cut paper/continuous paper), the results of RIP processing on the paper-specific marks in the previous output operation may be reused in the current output operation.

In the example in FIG. 12, furthermore, each of the additional marks is subjected to RIP processing again (S80) if the condition in which "the output destination printer in the previous output operation is identical to that in the current output operation and the output paper attributes (such as paper size) for the previous output operation are identical to those for the current output operation" is not satisfied. However, this may not necessarily be required. For example, in a system in which it is possible to arrange RIPed data of individual additional marks at desired positions on a physical page for imposition, the RIPed data of additional marks among the previously used additional marks which are also usable in the current output operation in terms of the printing method and output paper type (cut paper/continuous paper) of the output destination may be reused. That is, the RIPed data of such additional marks (that has previously been used and has been saved as the RIPed mark data of the previous output information) may be arranged at positions according to the page attributes, the paper attributes (such as paper size), and so forth on a physical page.

In the example illustrated in FIG. 12, only the immediately "previous" output history record of the job to be printed (the "previous output information" in FIG. 10) is referred to. Alternatively, output history information on the previous multiple output operations (the content of which is substantially the same as that of the "previous output information") for the job may be accumulated in the memory device 26, and a piece of history information selected by a user may be reused. In this case, when the user specifies the job to be printed, the user also specifies which of the previous output history records is to be reused. The layout (or imposition pattern) of the output history record to be reused is reused, whereas the output destination and the output paper attributes may be specified by a user (that is, the output destination and the output paper attributes may be different from the previous ones). Once the output history record to be reused is specified, the specified output history record may be used in a manner similar to that described above for the "previous output information" in the procedure illustrated in FIG. 12, and the procedure illustrated in FIG. 12 may be executed.

The controller 10 described above by way of example may be implemented by, for example, causing a general-purpose computer to execute a program representing the processing of each of the function modules described above. The computer has a circuit configuration in which, for example, hardware components such as a microprocessor such as a central processing unit (CPU), memory (primary memory) devices such as a random access memory (RAM) and a read-only memory (ROM), a hard disk drive (HDD) controller that controls an HDD, various input/output (I/O) interfaces, and a network interface that performs control to establish a connection with a network such as a local area network are connected via, for example, a bus. In addition, a disk drive configured to read and/or write data from and/or to portable disc recording media such as a compact disc (CD) and a digital versatile disc (DVD), a memory reader/writer configured to read and/or write data from and/or to portable non-volatile recording media compatible with various standards, such as a flash memory, and the like may be connected to the bus via, for example, an I/O interface. A program in which the content of the processing of each of the function modules described above by way of example is described is stored in a fixed memory device such as a hard disk drive through a recording medium such as a CD or a DVD or via a communication unit such as a network, and is installed into a computer. The program stored in the fixed memory device is read onto a RAM and is executed by a microprocessor such as a CPU, thereby implementing the function modules described above by way of example.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control device comprising:
a mark information memory that stores, for each type of printer, mark information which defines an additional mark in accordance with the type of printer;
a first print controller that, upon receiving a first printing instruction including print data to be printed which is written in a page description language and including specification of a first printer in an output destination, assigns identification information to the print data, combines interpretation result data obtained by interpretation of the print data using an interpretation device and an additional mark for the type of the first printer, the additional mark being based on the mark information stored in the mark information memory, to create imposition data, supplies the created imposition data to the first printer to print the imposition data, and saves the interpretation result data in a storage device in association with the assigned identification information; and
a second print controller that, upon receiving a second printing instruction including the identification information assigned to the print data to be printed and including specification of a second printer in an output destination, acquires the interpretation result data saved in association with the identification information from the storage device, combines the acquired interpretation result data and an additional mark for the type of the second printer, the additional mark being based on the mark information stored in the mark information memory, to create imposition data, and supplies the created imposition data to the second printer to print the imposition data.

2. The print control device according to claim 1, wherein the first print controller further saves first output history information in the storage device in association with the assigned identification information,
the first output history information including
type information indicating the type of the first printer, and
the additional mark for the type of the first printer, which is based on the mark information, and
in a case where the type of the second printer specified in the second printing instruction is identical to the type of the first printer, the second print controller acquires from the first output history information the additional mark included in the first output history information, without creating an additional mark using the mark information in accordance with the type of the second printer, and combines the acquired additional mark and the interpretation result data saved in association with the identification information to create imposition data.

3. The print control device according to claim 1, wherein in a case where the type of the second printer specified in the second printing instruction is different from the type of the first printer, the second print controller
obtains additional marks for the type of the second printer, the additional marks being based on the mark information, by
acquiring an additional mark among the additional marks which is identical to the additional mark for the type of the first printer, which is based on the mark information, from first output history information which is saved in association with the identification information specified in the second printing instruction, and
generating an additional mark among the additional marks which is different from the additional mark for the type of the first printer, which is based on the mark information, using the mark information in accordance with the type of the second printer, and
combines the acquired additional mark and the generated additional mark with the interpretation result data saved in association with the identification information to create imposition data.

4. The print control device according to claim 2, wherein in a case where the type of the second printer specified in the second printing instruction is different from the type of the first printer, the second print controller
obtains additional marks for the type of the second printer, the additional marks being based on the mark information, by
acquiring an additional mark among the additional marks which is identical to the additional mark for the type of the first printer, which is based on the mark information, from the first output history information, and
generating an additional mark among the additional marks which is different from the additional mark for the type of the first printer, which is based on the mark information, using the mark information in accordance with the type of the second printer, and
combines the acquired additional mark and the generated additional mark with the interpretation result data saved in association with the identification information to create imposition data.

5. The print control device according to claim 2, wherein
in a case where the second print controller creates the imposition data in accordance with the second printing instruction, the second print controller further saves second output history information in the storage device in association with the assigned identification information,
the second output history information including
type information indicating the type of the second printer, and
the additional mark for the type of the second printer, which is based on the mark information,
upon receiving a third printing instruction including the identification information assigned to the print data to be printed and including specification of a third printer in an output destination, the second print controller acquires the interpretation result data saved in association with the identification information from the storage device, and receives, from a user, specification as to which of the first output history information and the second output history information, which are saved in association with the identification information, is to be referred to, and
in a case where the type of the third printer specified in the third printing instruction is identical to the type of the printer included in one of the first output history information and the second output history information which is specified by the user, the second print controller acquires the additional mark included in the one of the first output history information and the second output history information which is specified by the user, without creating an additional mark using the mark information in accordance with the type of the third printer, and combines the acquired additional mark or additional marks and the interpretation result data saved in association with the identification information to create imposition data.

6. The print control device according to claim 3, wherein
in a case where the second print controller creates the imposition data in accordance with the second printing instruction, the second print controller further saves second output history information in the storage device in association with the assigned identification information,
the second output history information including
type information indicating the type of the second printer, and
the additional marks for the type of the second printer, which are based on the mark information,
upon receiving a third printing instruction including the identification information assigned to the print data to be printed and including specification of a third printer in an output destination, the second print controller acquires the interpretation result data saved in association with the identification information from the storage device, and receives, from a user, specification as to which of the first output history information and the second output history information, which are saved in association with the identification information, is to be referred to, and
in a case where the type of the third printer specified in the third printing instruction is identical to the type of the printer included in one of the first output history information and the second output history information which is specified by the user, the second print controller acquires the additional mark included in the first output history information or the additional marks included in the second output history information in accordance with the one of the first output history information and the second output history information which is specified by the user, without creating an additional mark using the mark information in accordance with the type of the third printer, and combines the acquired additional mark or additional marks and the interpretation result data saved in association with the identification information to create imposition data.

7. The print control device according to claim 4, wherein
in a case where the second print controller creates the imposition data in accordance with the second printing instruction, the second print controller further saves second output history information in the storage device in association with the assigned identification information,
the second output history information including
type information indicating the type of the second printer, and
the additional marks for the type of the second printer, which are based on the mark information,
upon receiving a third printing instruction including the identification information assigned to the print data to be printed and including specification of a third printer in an output destination, the second print controller acquires the interpretation result data saved in association with the identification information from the storage device, and receives, from a user, specification as to which of the first output history information and the second output history information, which are saved in association with the identification information, is to be referred to, and
in a case where the type of the third printer specified in the third printing instruction is identical to the type of the printer included in one of the first output history information and the second output history information which is specified by the user, the second print controller acquires the additional mark included in the first output history information or the additional marks included in the second output history information in accordance with the one of the first output history information and the second output history information which is specified by the user, without creating an additional mark using the mark information in accordance with the type of the third printer, and combines the acquired additional mark or additional marks and the interpretation result data saved in association with the identification information to create imposition data.

8. A non-transitory computer readable medium storing a program causing a computer to execute a process, the process comprising:
storing in a memory, for each type of printer, mark information which defines an additional mark in accordance with the type of printer;
upon receiving a first printing instruction including print data to be printed which is written in a page description language and including specification of a first printer in an output destination, assigning identification information to the print data, combining interpretation result data obtained by interpretation of the print data using an interpretation device and an additional mark for the type of the first printer, the additional mark being based on the mark information stored in the memory, to create imposition data, supplying the created imposition data to the first printer to print the imposition data, and saving the interpretation result data in a storage device in association with the assigned identification information; and
upon receiving a second printing instruction including the identification information assigned to the print data to be printed and including specification of a second printer in an output destination, acquiring the interpretation result data saved in association with the identification information from the storage device, combining the acquired interpretation result data and an additional mark for the type of the second printer, the additional mark being based on the mark information stored in the memory, to create imposition data, and supplying the created imposition data to the second printer to print the imposition data.

9. A print control device comprising:
a mark information memory that stores, for each type of printer, mark information which defines an additional mark in accordance with the type of printer;
a registration unit that, upon receiving print data written in a page description language, assigns identification information to the received print data, and registers interpretation result data obtained by interpretation of the print data using an interpretation device, in a storage device in association with the assigned identification information; and
an additional mark combining unit that receives specification of identification information that identifies print data to be printed and specification of a printer in an output destination, combines an additional mark with the interpretation result data saved in association with the specified identification information on the print data to create imposition data, the additional mark being generated using the mark information in accordance with the type of the specified printer in the output destination, the additional mark combining unit supplying the created imposition data to the specified printer in the output destination.

10. A non-transitory computer readable medium storing a program causing a computer to execute a process, the process comprising:
storing in a memory, for each type of printer, mark information which defines an additional mark in accordance with the type of printer;
upon receiving print data written in a page description language, assigning identification information to the received print data, and registering interpretation result data obtained by interpretation of the print data using an interpretation device, in a storage device in association with the assigned identification information; and
receiving specification of identification information that identifies print data to be printed and specification of a printer in an output destination, combining an additional mark with the interpretation result data saved in association with the specified identification information on the print data to create imposition data, the additional mark being generated using the mark information in accordance with the type of the specified printer in the output destination, and supplying the created imposition data to the specified printer in the output destination.

* * * * *